Oct. 29, 1963 R. F. HODGSON 3,108,701
HYDROSTATIC TRANSMISSION
Filed March 8, 1962 2 Sheets-Sheet 2

INVENTOR
Robert F. Hodgson

BY *Dodge and Sons*

ATTORNEYS

# United States Patent Office 3,108,701
Patented Oct. 29, 1963

3,108,701
HYDROSTATIC TRANSMISSION
Robert F. Hodgson, Kalamazoo, Mich., assignor to The New York Air Brake Company, a corporation of New Jersey
Filed Mar. 8, 1962, Ser. No. 178,354
7 Claims. (Cl. 214—140)

This invention relates to hydrostatic transmissions for propelling vehicles carrying power-operated work-performing implements.

The prime example of the type of vehicle with which this invention is concerned is the wheeled loader or shovel. In the usual case, these vehicles are provided at their front ends with pivoted bucket arms to which are pivoted the material-handling buckets. The bucket arm is raised and lowered by a double-acting piston motor, called the lift motor, and the bucket is tilted by a second double-acting piston motor, called the tilt motor. Both motors are supplied with hydraulic fluid under pressure from a pump driven by the vehicle engine. During bucket-filling operation, it is necessary to actuate the lift motor in order to raise the bucket. It also is necessary, in order to obtain a full bucket and to minimize time, to propel the vehicle forward to "crowd" the bucket into the bank or pile of material being loaded. Generally speaking, the torque load imposed on the engine by this simultaneous actuation of the vehicle wheels and the lift motor during the bucket-filling operation, and particularly at the moment the bucket breaks out of the bank or pile, is greater than during any other operation of the loader.

When the loader is equipped with a straight mechanical transmission for transmitting power from the engine to the wheels, the wheels must be declutched from the engine, or the clutch allowed to slip, during the bucket-filling operation in order to prevent stalling of the engine or avoid prolonged loading cycles. This is an undesirable feature because it tends to result in incomplete filling of the bucket and in undue wear of the clutch mechanism. In an effort to avoid these disadvantages, the industry has proposed the use of torque converter transmissions. With this type of transmission, the torque converter itself stalls during the bucket-filling operation, but power is still applied to the wheels and thus the bucket is crowded into the material being loaded. However, the engine in this case must be capable of driving the implement pump at the selected speed and at maximum system pressure while also driving the torque converter at the stall point.

Hydrostatic transmissions using variable displacement pumps or motors have also been proposed for use in loaders. Although these transmissions afford the same crowding action as the torque converter while imposing a smaller maximum torque demand on the engine, they are, at least at the present time, generally quite expensive.

The object of this invention is to provide a hydrostatic transmission for vehicles of the type mentioned above which affords the crowding action characteristic of the torque converter and the variable displacement hydrostatic transmission, but which is more economical than the variable displacement transmission and imposes a smaller maximum torque demand on the engine than the torque converter transmission. According to this invention, the transmission includes a pair of fixed displacement pumps, one of which supplies a propulsion circuit containing a fixed displacement propulsion motor and the other of which supplies an implement circuit containing the implement-operating motors. Normally the two circuits operate independently but during high torque operations, such as "break-out" with a loader, both circuits are supplied in parallel from one of the pumps and the other pump is unloaded. With this arrangement, the maximum torque load imposed on the engine is reduced while at the same time permitting simultaneous operation of the propulsion and implement motors. Since the transmission uses fixed displacement equipment it is, at least at present, inherently more economical than the variable displacement transmission mentioned above.

Another feature of this transmission relates to the provision of means for combining the outputs of both pumps and delivering them to the propulsion circuit. This feature is desirable because it permits high speed operation of the vehicle.

The preferred embodiment of the invention is described herein with reference to the accompanying drawings in which.

Figure 1:
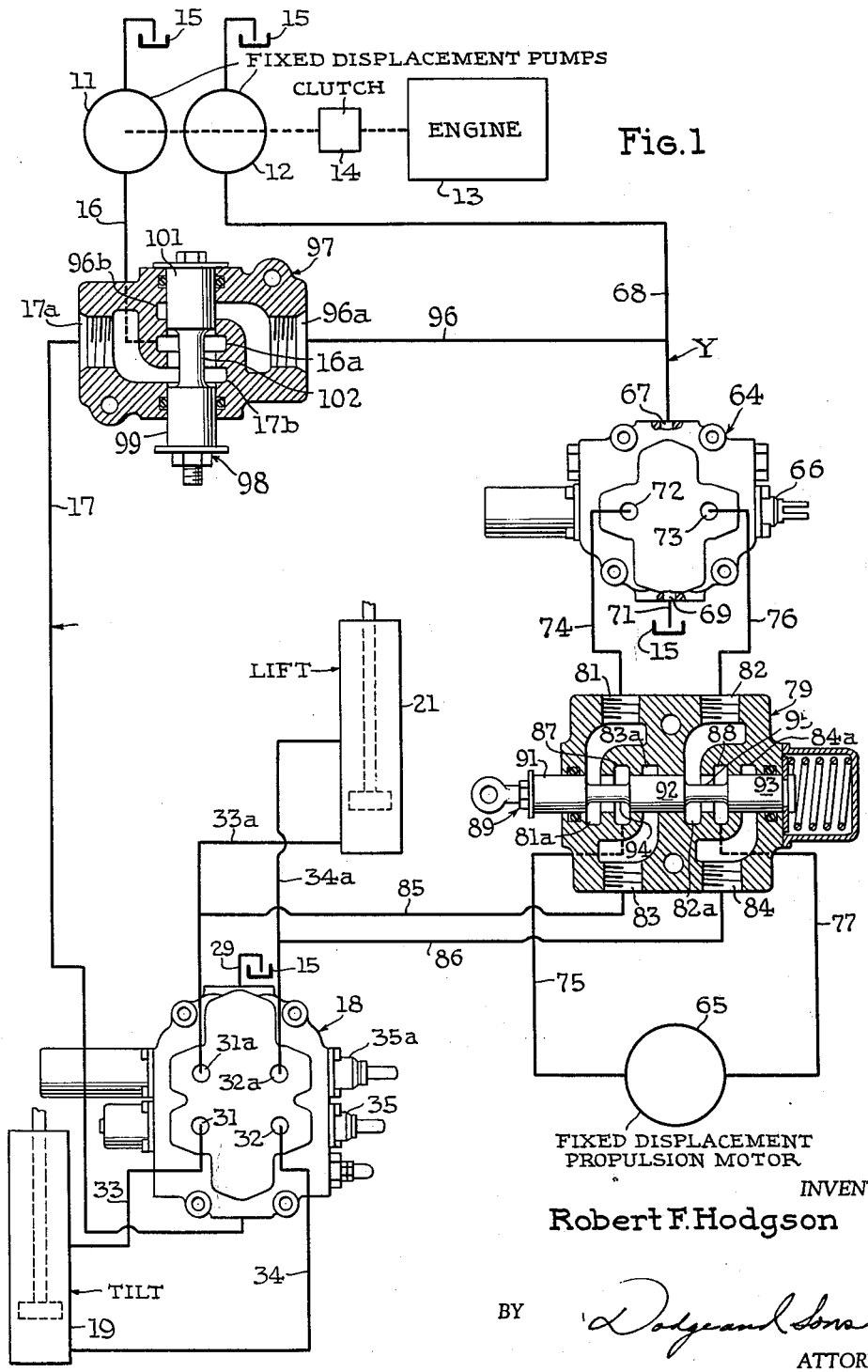
FIG. 1 is a diagram, partly in schematic form, showing the hydrostatic transmission as used in a wheeled loader.
Figure 3:
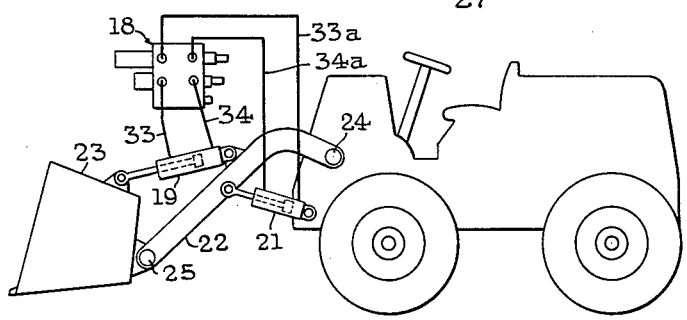
FIG. 3 is a simplified view of a wheeled loader showing the arrangement of the tilt and lift motors.

As shown in FIG. 1, the transmission includes a pair of fixed displacement pumps 11 and 12 that are driven by the vehicle engine 13 through a clutch 14 and are arranged to deliver fluid under pressure from reservoir 15 to the implement and propulsion circuits X and Y, respectively. The implement circuit X comprises a pair of conduits 16 and 17 which, during normal operation, lead the fluid discharged by pump 11 to a directional control valve 18, and a pair of double-acting piston motors 19 and 21. As shown in FIG. 3, the lift motor 21 is connected with the frame of the loader and the bucket arm 22 and effects raising and lowering of the bucket 23 by pivoting arm 22 about pivot 24. Tilt motor 19 reacts between bucket arm 22 and bucket 23 for pivoting the bucket about pivot 25.

Figure 2:
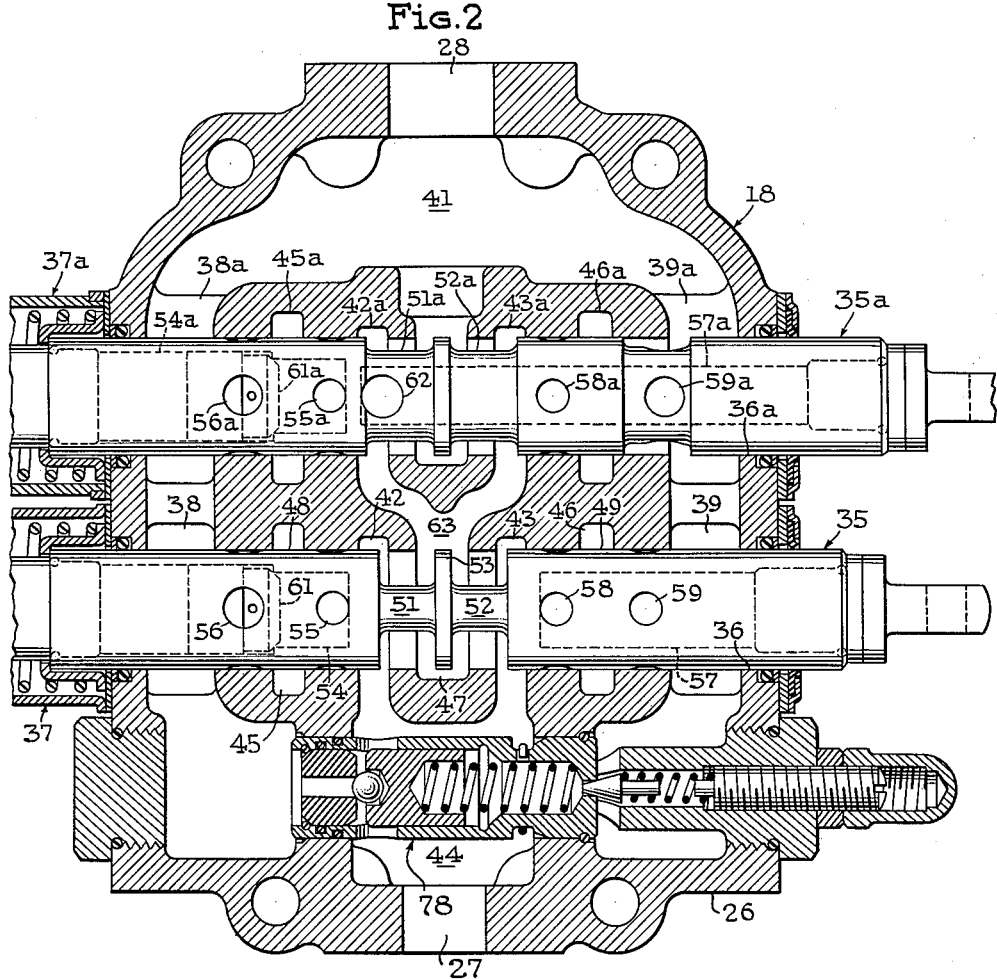
FIG. 2 is an enlarged sectional view of the directional control valve used in the implement circuit portion of FIG. 1.

Referring to FIG. 2, the directional control valve 18 is of the conventional sliding plunger type including a housing 26 having an inlet port 27 connected with conduit 17, an exhaust port 28 connected with reservoir 15 through conduit 29, a pair of motor ports 31 and 32 connected with the rod and head ends of tilt motor 19 by conduits 33 and 34, respectively, and a pair of motor ports 31a and 32a connected with the head and rod ends of lift motor 21 by conduits 33a and 34a, respectively. Flow to and from motor ports 31 and 32 is controlled by a three-position hollow valve plunger 35 reciprocable in a through bore 36 formed in housing 26 and biased by centering spring assembly 37 to the illustrated neutral position. Bore 36 is encircled by a pair of annular exhaust chambers 38 and 39 that are in continuous communication with exhaust port 28 through exhaust manifold 41, two annular supply chambers 42 and 43 that communicate with inlet port 27 through passage 44, a pair of annular motor chambers 45 and 46 that communicate, respectively, with motor ports 31 and 32, and a central annular chamber 47. When valve plunger 35 is in the illustrated neutral position, plunger lands 48 and 49 isolate annular chambers 45 and 46 from each other and from the other chambers so no fluid can flow either to or from either side of tilt motor 19. At this time, plunger grooves 51 and 52 connect central chamber 47 with the supply chambers 42 and 43, respectively. When the plunger 35 is shifted to the right to its second operative position, plunger lands 48 and 53 interrupt communication between central chamber 47 and supply chambers 42 and 43, closed ended axial bore 54 and radial passages 55 and 56 formed in one end of the plunger interconnect annular chambers 42 and 45, and closed ended axial bore 57 and radial passages 58 and 59 formed in the other end of the plunger interconnect annular chambers 39 and 46. In this position, fluid under pressure is supplied to the rod end of tilt motor 19 and the head end of that motor is connected to reservoir 15. Therefore, the motor 19 tilts the bucket in the clockwise direction about pivot 25. In accordance with conventional practice, a check valve 61 is interposed in axial bore 54 in order to prevent momentary counterclockwise movement of bucket 23 as the valve plunger 35 is shifted from the neutral to the second position.

The plunger 35 is shifted to the left from the illustrated neutral position to the third operative position. In this position plunger lands 49 and 53 interrupt communication between central annular chamber 47 and the supply chambers 42 and 43, axial bore 54 and radial passages 55 and 56 interconnect annular chambers 38 and 45, and axial bore 57 and radial passages 58 and 59 interconnect annular chambers 43 and 46. The head end of tilt motor 19 is now supplied with pressure fluid and the rod end is connected with reservoir 16 so the motor moves bucket 23 in the counterclockwise direction about pivot 25.

Flow to and from motor ports 31a and 32a is controlled by a four-position hollow valve plunger 35a received in through bore 36a. This plunger has the same three operative positions as plunger 35 and in addition has a fourth or "float" position to the left of the third position in which plunger groove 52a interconnects annular chambers 42a and 47a, plunger groove 51a, radial passages 62, axial bore 57a and radial passages 59a interconnect the two motor chambers 45a and 46a, and radial passages 58a interconnect axial bore 57a and annular chamber 47a. When the plunger 35a is in this "float" position, the head and rod ends of lift motor 21 are connected with each other and with the pump and reservoir so the bucket 23 can move up and down relatively freely under the action of external loads.

It will be noticed in FIG. 2 that the central annular chamber 47 associated with tilt plunger 35 is connected by a passage 63 with the supply chambers 42a and 43a associated with lift plunger 35a, and that when both plungers 35 and 35a are in their neutral positions there is an unrestricted flow path between inlet and exhaust ports 27 and 28 comprising passage 44, chambers 42 and 43, plunger grooves 51 and 52, annular chamber 47, passage 63, annular chambers 42a and 43a, plunger grooves 51a and 52a, annular chamber 47a and exhaust manifold 41. Because of the presence of this path, pump 11 is unloaded when these plungers are in neutral.

The propulsion circuit Y includes the pump 12, a directional control valve 64 and a fixed displacement propulsion motor 65 that is connected with the wheels of the loader. The directional control valve 64 is of the sliding plunger type and has a single three-position hollow valve plunger 66 identical to the plunger 35 of valve 18. The inlet port 67 of the valve 64 is connected with pump 12 by conduit 68, the exhaust port 69 is connected with reservoir 15 via conduit 71, and the motor ports 72 and 73 are connected with opposite sides of the propulsion motor 65 by pairs of conduits 74, 75 and 76, 77. When plunger 66 is shifted to the right to pressurize and vent conduits 74 and 76, respectively, motor 65 propels the loader forward, and when the plunger is shifted to the left to reverse the pressure relationship between these conduits, motor 65 drives the loader in reverse. Directional control valve 64, like its counterpart 18 in the implement circuit X, provides an unrestricted unloading path for pump 12 when plunger 66 is in neutral position. Valve 64 also includes a pilot-operated relief valve, similar to the relief valve 78 in directional control valve 18, but since, as explained below, the outputs of both of the pumps 11 and 12 can be delivered to valve 64, its relief valve must be designed to handle the combined flow capacities of the two pumps.

Propulsion circuit Y also includes a double-acting selector valve 79 that is interposed between conduits 74 and 76, on the one hand, and conduits 75 and 77 on the other hand, and which serves to selectively connect propulsion motor 65 with directional control valves 18 and 64. Selector valve 79 comprises a housing containing a first pair of ports 81 and 82 which are connected with conduits 74 and 76, respectively, and lead to annular chambers 81a and 82a, a second pair of ports 83 and 84 that are connected with implement circuit conduits 33a and 34a via conduits 85 and 86, respectively, and lead to annular chambers 83a and 84a, and a third pair of ports (not shown) which connect with conduits 75 and 77 and lead to annular chambers 87 and 88. Flow between chambers is controlled by a spring biased sliding valve plunger 89 provided with lands 91, 92, and 93 and grooves 94 and 95, and having a first position (illustrated in FIG. 1) in which grooves 94 and 95 interconnect chambers 81a and 87 and 82a and 88, respectively, and lands 92 and 93 isolate chambers 83a and 84a, respectively, and a second position in which grooves 94 and 95 interconnect chambers 83a and 87 and 84a and 88, respectively, and lands 91 and 92 isolate chambers 81a and 82a, respectively. Thus when selector valve plunger 89 is in the first position motor 65 is connected with and under the control of directional control valve 64, and when plunger 89 is in its second position motor 65 is connected in parallel with lift motor 21 and is under the control of directional control valve 18. The plunger 89 of the selector valve can be operated by either a separate actuating lever or by the actuating lever for lift plunger 35a. In the latter case the lever linkage includes a lost motion connection whereby plunger 35a may be placed in its second position and thereafter further movement of the lever shifts plunger 89 to its second position.

At certain times, for example, when the loader is traveling along a highway, it is desirable to have available a maximum propulsion speed greater than that normally required in the area in which material is loaded. With this end in mind, the preferred embodiment of the invention includes a cross-over conduit 96 which, under the control of a single-acting selector valve 97, can deliver the output of pump 11 to the propulsion circuit Y. The selector valve 97 has an inlet port (not shown) that is connected with conduit 16 and leads to chamber 16a, and two outlet ports 17a and 96a that are connected with conduits 17 and 96, respectively, and lead to annular chambers 17b and 96b. Communication between chambers is controlled by a sliding valve plunger 98 carrying lands 99 and 101 separated by a groove 102. In the position of plunger 98 illustrated in FIG. 1, land 101 isolates chamber 96b and groove 102 interconnects chambers 16a and 17b so the output of pump 11 is delivered to directional control valve 18. When plunnger 98 is shifted upward to its second position, land 99 isolates chambers 17b and groove 102 interconnects chambers 16a and 96b. Thus in the second position the output of pump 11 is delivered to directional control valve 64.

*Operation*

Under normal conditions, the selector valves 79 and 97 are in their illustrated positions and the implement and propulsion circuits operate independently of each other. The fluid discharged by pump 11 is led into the implement circuit X where, under the control of the directional control valve plungers 35 and 35a, it can be used to actuate tilt and lift motors 19 and 21 in reverse directions and thus effect tilting and raising and lowering of the bucket 23. When no movement of the bucket 23 is required, pump 11 is unloaded to reservoir 15 through the open-center unloading path through directional control valve 18. The fluid discharged by pump 12 is fed into the propulsion circuit Y for operation of propulsion motor 65 in forward and reverse directions under the action of directional control valve 64. Since the speed at which pump 12 is driven, and consequently its discharge rate, is a function of the speed of engine 13, the speed of travel of the loader depends upon the setting of the engine throttle. When no movement of the loader is required, plunger 66 of the direction control valve 64 is moved to its neutral position and pump 12 is unloaded to reservoir 15 through the open-center unloading path through this valve.

During high speed roading operations, the plunger 98 of selector valve 97 is shifted upward to disconnect conduit 16 from conduit 17 and connect it with cross-over conduit 96. The combined output of the two pumps 11 and 12 is now available for operation of motor 65. Of course, this shift of selector valve 97 isolates the implement circuit X from pump 11, but this is no disadvantage since the bucket 23 is not moved relatively to the loader during high speed roading.

During bucket-filling operations requiring simultaneous lifting and crowding of bucket 23, plunger 66 of directional control valve 64 is moved to neutral position to unload pump 12 and plunger 89 of selector valve 79 is shifted to its second position to thereby connect propulsion motor 65 in parallel with lift motor 21. When lift plunger 35a is then shifted to the right to pressurize and vent conduits 33a and 34a, respectively, and thereby cause motor 21 to move bucket arm 22 in a clockwise direction about pivot 24, a portion of the output of pump 11 is diverted through propulsion motor 65 along a path comprising conduit 85, port 83, annular chamber 83a, plunger groove 94, annular chamber 87, conduits 75 and 77, annular chamber 88, plunger groove 95, annular chamber 84a, port 84 and conduit 86. Therefore, as the lift motor 21 raises the bucket 23, propulsion motor 65 is operated to drive the loader in the forward direction and crowd the bucket into the bank or pile of material being loaded. The simultaneous operation of both the lift and propulsion motors insures rapid and complete filling of the bucket, and since only one of the two pumps 11 and 12 is loaded during this operation, the torque demand on the engine 13 is not excessive.

In the illustrated embodiment, the directional control valve 18 is so designed that the supply chambers for the two plungers are in series and the exhaust chambers are in parallel. It will be understood by those skilled in the art that a straight series or a straight parallel flow circuit can be used. It also will be obvious that in lieu of using directional control valves 18 and 64, of the open-center type, i.e., valves that provide an unrestricted pump loading path when the plungers are in neutral position, closed center valves with separate pump unloaders can be employed.

As stated previously, the drawings and description relate only to the preferred embodiment of the invention. Since changes, some of which have been indicated, can be made in the structure of the embodiment without departing from the inventive concept, the following claims should provide the sole measure of the scope of the invention.

What is claimed is:

1. In combination
   (a) a vehicle having motion imparting means;
   (b) a work-performing movable implement carried by the vehicle, said implement being of the type that during certain operations requires movement relatively to the vehicle as well as movement of the vehicle;
   (c) a prime mover for the vehicle;
   (d) first and second hydraulic motors connected, respectively, with the motion-imparting means and the implement;
   (e) a pair of fixed displacement hydraulic pumps connected in driven relation with the prime mover;
   (f) reservoir means;
   (g) a propulsion circuit interconnecting the reservoir means, the first pump and the first motor and including a first control valve interposed between the first pump and the first motor for selectively connecting and disconnecting these two units;
   (h) an implement circuit interconnecting the reservoir means, the second pump and the second motor and including a second control valve interposed between the second pump and second motor for selectively connecting and disconnecting these two units;
   (i) first unloading means associated with the propulsion circuit for unloading the first pump when it is disconnected from the first motor;
   (j) second unloading means associated with the implement circuit for unloading the second pump when it is disconnected from the second motor; and
   (k) valve means connected with the implement and propulsion circuits and arranged to selectively connect one of the motors with its control valve and with the other circuit.

2. The combination defined in claim 1 including second valve means connected with the propulsion circuit and with the implement circuit at a point between the second pump on the one hand and the second control valve and the second unloading means on the other hand and arranged to selectively connect the second pump with the second control valve and unloading means and with the propulsion circuit.

3. In combination
   (a) a vehicle having motion-imparting means;
   (b) a work-performing implement carried by the vehicle and movable in opposite directions, said implement being of the type that during certain operations requires movement relatively to the vehicle in a first direction as well as movement of the vehicle in a second direction;
   (c) a prime mover for the vehicle;
   (d) first and second reversible fixed displacement hydraulic motors connected, respectively, with the motion-imparting means and the implement, each motor having a pair of ports and being movable in reverse directions depending upon which port is pressurized;
   (e) a pair of fixed displacement hydraulic pumps connected in driven relation with the prime mover,
   (f) reservoir means;
   (g) a propulsion circuit interconnecting the reservoir means, the first pump and the first motor and including a first control valve having one position in which the motor is isolated from both the pump and the reservoir means, a second position in which the first port of the motor is connected with the pump and the second port is connected with the reservoir means, and a third position in which the connections between the motor ports and the pump and reservoir means are reversed, the motor moving in said second direction when the valve is in the second position;
   (h) an implement circuit interconnecting the reservoir means, the second pump and the second motor and including a second control valve having one position in which the motor is isolated from both the pump and the reservoir means, a second position in which the first port of the motor is connected with the pump and the second port is connected with the reservoir means, and a third position in which the connections between the two motor ports and the pump and reservoir means are reversed, the motor moving in said first direction when the valve is in the second position;
   (i) first unloading means associated with the propulsion circuit for unloading the first pump when the first control valve is in said one position;
   (j) second unloading means associated with the implement circuit for unloading the second pump when the second control valve is in said one position; and
   (k) valve means connected with the implement and propulsion circuits and having a first position in which it connects the first and second motor ports of one motor with the first and second ports, respectively, of the other motor and isolates the ports of said one motor from the control valve in the circuit with which it is associated, and a second position in which it connects the first and second ports of said one motor with the control valve in the circuit with which it is associated and isolates them from the ports of said other motor.

4. The combination defined in claim 3 in which each unloading means comprises a portion of the control valve in the associated circuit which serves to connect the pump with the reservoir means when the control valve is in said one position.

5. The combination defined in claim 4 including second valve means connected with the two circuits at points between the pumps and the control valves and having a first position in which it connects the second pump with the propulsion circuit and isolates it from the second control valve, and a second position in which it isolates the second pump from the propulsion circuit and connects it with the second control valve.

6. In combination
   (a) a self-propelled loader including an engine, at least one drive wheel, a material handling bucket, bucket-raising and lowering mechanism, and bucket-tilting mechanism;
   (b) at least one fixed displacement reversible hydraulic propulsion motor connected with the drive wheel for propelling the loader, the motor having a pair of motor ports and being arranged to propel the loader in the forward direction when the first port is pressurized and the second port is vented and to propel the loader in the reverse direction when the first port is vented and the second port is pressurized;
   (c) a first double-acting piston motor connected with the bucket raising and lowering mechanism, the motor having opposed working chambers and being arranged to raise the bucket when the first chamber is pressurized and the second chamber is vented and to lower the bucket when the first chamber is vented and the second chamber is pressurized;
   (d) a second double-acting piston motor connected with the bucket tilting mechanism for tilting the bucket in opposite directions;
   (e) a pair of fixed displacement hydraulic pumps, each having an inlet port and an exhaust port;
   (f) drive means, including a clutch, connecting the two pumps in driven relation with the engine;
   (g) a reservoir;
   (h) a propulsion circuit comprising;
      (1) a directional control valve provided with inlet, exhaust, and a pair of motor ports, and a movable element having a first position in which it connects the inlet and exhaust ports and isolates each motor port from the other three ports, a second position in which it isolates the inlet port from the exhaust port, connects the inlet port with the first motor port and connects the exhaust port with the second motor port, and a third position in which it isolates the inlet port from the exhaust port, connects the inlet port with the second motor port and connects the exhaust port with the first motor port,
      (2) a first conduit connecting the inlet port of the directional control valve with the discharge port of the first pump,
      (3) a second conduit connecting the reservoir with the inlet port of the first pump, and
      (4) third and fourth conduits connecting the first and second motor ports of the directional control valve with the first and second ports, respectively, of the propulsion motor;
   (i) an implement circuit comprising;
      (1) a directional control valve unit provided with inlet and exhaust ports and two directional control valves, each directional control valve having a pair of motor ports and a movable element which in one position isolates each motor port, in a second position connects the first motor port with the inlet port and connects the second motor port with the exhaust port, and in a third position connects the first motor port with the exhaust port and connects the second motor port with the inlet port, the directional control valves being so arranged that the inlet and exhaust ports are connected when both movable elements are in said one position and are isolated from each other when either element is in its second or third position,
      (2) a first conduit connecting the inlet port of the directional control valve unit with the discharge port of the second pump,
      (3) a second conduit connecting the inlet port of the second pump with the reservoir,
      (4) third and fourth conduits connecting the first and second motor ports of the first directional control valve with the first and second chambers, respectively, of the first double-acting piston motor, and
      (5) fifth and sixth conduits connecting the first and second motor ports of the second directional control valve with the opposite sides of the second double-acting piston motor; and
   (j) valve means connected with the third and fourth conduits of each circuit and movable between a first position in which flow between one motor and its associated directional control valve is interrupted and the third and fourth conduits connected with that motor are connected with the third and fourth conduits, respectively, associated with the other motor, and a second position in which the said one motor is connected with the associated directional control valve through the third and fourth conduits and the interconnections between the third and fourth conduits of the two circuits are interrupted.

7. The combination defined in claim 6 including a selector valve connected with the first conduits of the two circuits and having a first position in which flow through the first conduit of the implement circuit between the second pump and the directional control valve unit is interrupted and the second pump is connected with the first conduit of the propulsion circuit, and a second position in which the second pump is isolated from the propulsion circuit and is connected with the directional control valve unit of the implement circuit through the first conduit of that circuit.

No references cited.